June 19, 1962 K. B. BREDTSCHNEIDER 3,039,484
BALL VALVE FOR HIGH PRESSURE SERVICE Filed Jan. 3, 1961 3 Sheets-Sheet 1

Inventor.
Kurt B. Bredtschneider.
By Joseph O. Longe Atty.

June 19, 1962 K. B. BREDTSCHNEIDER 3,039,484
BALL VALVE FOR HIGH PRESSURE SERVICE
Filed Jan. 3, 1961 3 Sheets-Sheet 2

Inventor.
Kurt B. Bredtschneider.
By Joseph O. Lange Atty

June 19, 1962 K. B. BREDTSCHNEIDER 3,039,484
BALL VALVE FOR HIGH PRESSURE SERVICE
Filed Jan. 3, 1961 3 Sheets-Sheet 3
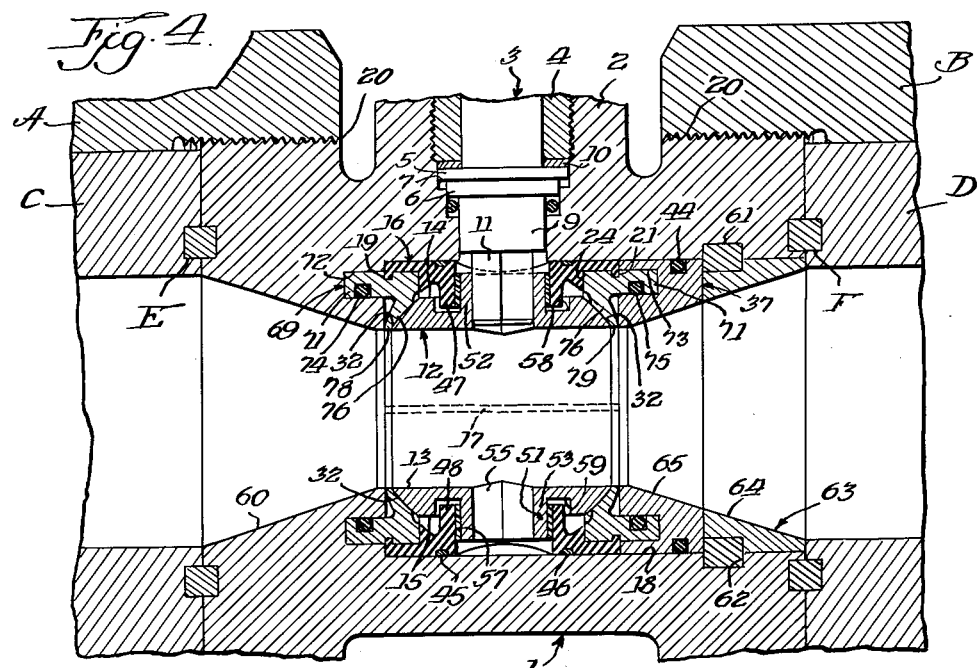
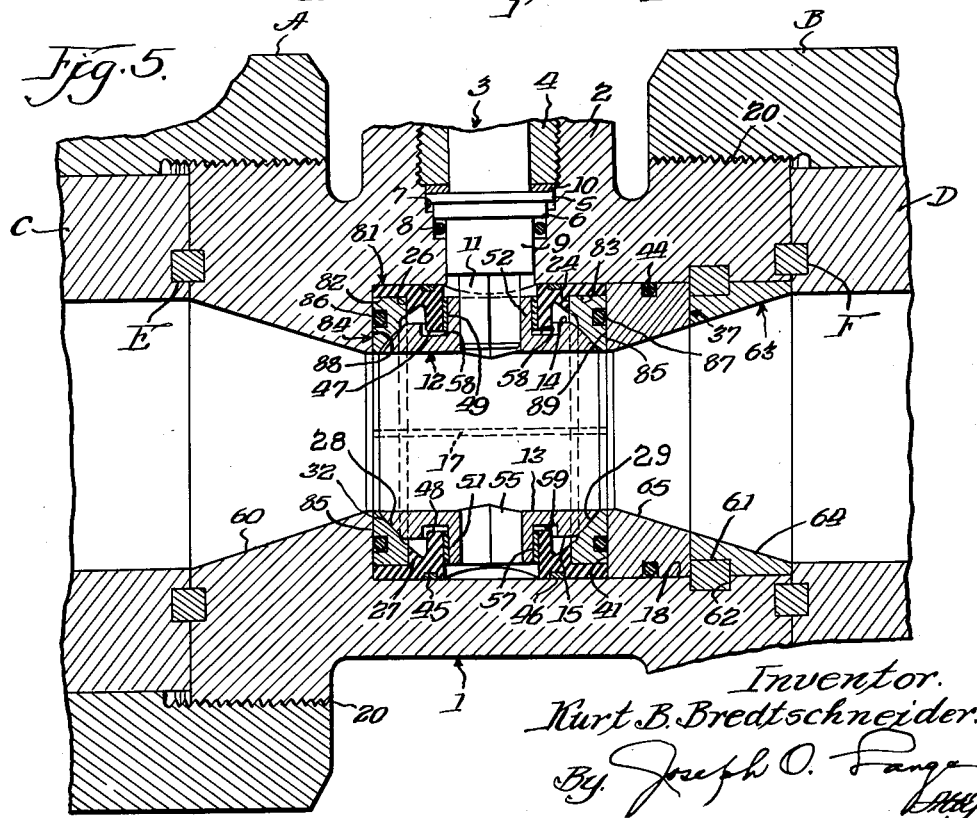
Inventor.
Kurt B. Bredtschneider.
By Joseph O. Lange
Atty.

United States Patent Office 3,039,484
Patented June 19, 1962

3,039,484
BALL VALVE FOR HIGH PRESSURE SERVICE
Kurt B. Bredtschneider, Chicago, Ill., assignor to Crane Co., Chicago, Ill., a corporation of Illinois
Filed Jan. 3, 1961, Ser. No. 80,097
14 Claims. (Cl. 137—454.2)

This invention relates to that type of rotary valve generally termed a ball valve by those skilled in the art, and, more particularly, it is concerned with a type of ball valve construction especially suitable for fine performance on relatively high fluid pressures and other forms of severe service conditions.

In appreciation of the problems encountered when ball valves have been previously considered for relatively high fluid pressure service, it should be understood that these valves which normally employ a free-floating ball as the valve closure member have seldom been entirely acceptable, because the specific seat load or end thrust on the seat rings becomes excessively high and as a result the seats are often seriously damaged when the valve is operated. This condition arises as a consequence of the high fluid pressure measured by the port area of the valve acting on the said closure member and the seats substantially transversely to the vertical axis of the valve creates excessive transverse loads on stem, valve seats and closure member.

There are valves available on the market in which a fixed axis ball and floating or flexible seat rings have been employed. However, these valves are subject to the objection that they require either a special valve body opening large enough to be able to install the ported ball closure member in the direction of the closure rotating axis or else the supporting bearings therefor necessarily must be removable through the top and bottom openings of the valve body before the ball closure member with its conventional two trunnions can be removed through one of the port openings of the valve housing. This arrangement necessitates a relatively expensive and cumbersome construction having obvious objections also in the field from maintenance and installation viewpoints.

Therefore, it is one of the more important purposes of the instant invention to provide a unique and durable ball valve construction suitable for high pressure services. It provides means in which the rotatable ball closure member with its pair of trunnions axially aligned with seat rings therefor end disposed can be conveniently arranged to fit inside a horizontally split cylindrical cage. The latter members together with the closure member are removable as a unit quickly and conveniently through one of the valve port openings whereby to easily overcome prior objections while still providing unusual valve durability.

A further object is to provide for a valve construction in which each of the upper and lower halves of a divided cage member provides a suitable bearing conveniently and if desired in a variety of materials for accommodating the ball closure trunnions.

Another object of this invention is to provide for a valve construction in which a shouldered and easily removable ring in the port of the valve casing is employed to maintain the cage member inside said valve casing, and which ring preferably employs convenient sealing means on the outer periphery thereof to bear against the valve body. It is preferably held in place by means of a snap ring with a retainer of the same general description to resist line pressure thrust parallel to the valve axis of fluid flow through the valve.

A still further object is to provide for a valve construction in which the seat rings for the ball closure member may be made either of a flexible or resilient rubber, composition, or of metal and which rings may be suitably drawn up against the ball closure member to effect a fluid tight seal in the normal course of valve operation.

Another object is to provide for a suitable sealing means, such as an O-ring, to be retained against the valve body and the shoulder ring as hereinafter described.

A still further object is to provide for a beneficial construction in which line fluid pressure acting on the port area of the valve is transmitted to the trunnion bearings. Therefore, as will hereinafter be more readily understood, only the ring area respectively between the sealing means such as the O-rings and the outside of the seat rings and the contact diameter between the seat rings and the ball closure member multiplied by the fluid pressure encountered in the pipeline functions as the seating force by which the valve is kept tight.

Other objects and advantages will be more readily apparent upon proceeding with the following descriptions read in light of the accompanying drawings, in which:

FIGS. 3 to 5 inclusive are views of modified forms of the invention.

Similar reference numerals refer to similar parts throughout the several views.

Figure 1:
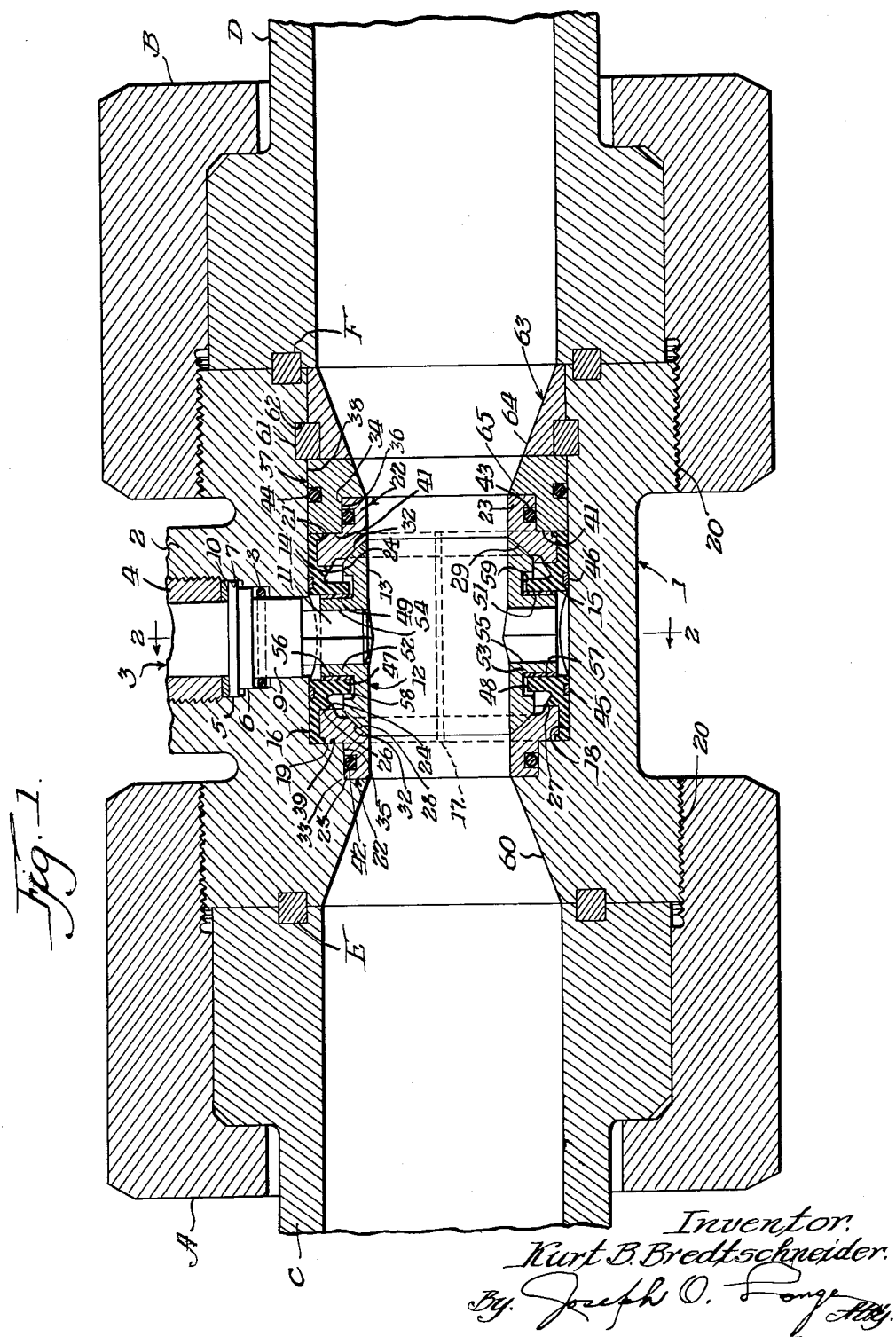
FIG. 1 is a fragmentary sectional assembly view of a preferred form of my invention.

Referring now to FIG. 1 is a valve body or casing generally designated 1. It has the usual connecting union rings A and B mounted on threads 20 for effecting attachment to the usual conduits C and D and with the fluid sealing gaskets E and F positioned therebetween as shown. Obviously other forms of pipe line attachment means can be used as required. The body is of substantionally cylindrical or tubular configuration except for the upper side extension portion thereof designated 2. The latter portion serves as the usual means for journalling the actuating member such as the valve stem 3, the lower portion only of which is shown. The said stem is retained and held against substantial axial movement by a suitably threaded stem hole bushing 4, threadly attached to the casing portion 2, the stem being provided with the shoulders 5 and 6 respectively received within the respective shouldered bore portions 7 and 8 as illustrated. A thrust washer 10 completes this stem retainer assembly. Of course, any similar means may be used for such stem retention without affecting this invention.

At a lowermost portion thereof, the stem is provided with the cylindrical extension 9 from which the square or other polygonal section 11 depends for effecting nonrotatable engagement with the ported ball closure member generally designated 12. It will be appreciated that the latter member is of generally spherical configuration except for the flow passage or continuous port 13 and the upper and lower annular horizontally disposed surfaces 14 and 15 respectively and the attendant annular recesses indicated at 58 and 59. The closure member in the instant construction is fitted within a horizontally divided cage generally designated 16 of a suitable composition or metal depending upon the character and severity of the service for which the valve is being recommended. The said split cage member 16 as indicated is preferably of a two-piece construction, being split on oppositely disposed side portions preferably in a plane on the horizontal axis as indicated at 17 and is fitted closely within the cylindrical bored portion 18 of the body 1 as more clearly shown in FIG. 2. It will be noted that at each end limit thereof, the upper and lower halves of the divided cage member 16 are provided with the coinciding or oppositely disposed inturned annular flange end portions 19 and 21 to slip over and retain the respective seat rings at each outer end annular portion thereof and generally designated 22. Each of these seat rings is provided with an inner flat annular surface 24, which surfaces bear against the respective inturned circular hubs 26 and 27 in straightline surface relation thereto at the upper and lower portions thereof to bear against the annular surface 24 in the same vertical plane. Thus, it will be appreciated that the overlying surfaces 26 and 27 are straight and transversely extending and thus make the straight surface contact as distinguished from a tangential point contact with an arcuate surface portion of the transverse surfaces 24 of the seats 22. The valve seats 22 are formed with concave spheroidal configuration at 28 and 29 to receive the convex spherical surfaces 32 of the closure member to form therebetween the fluid sealing contact as shown. Said seat rings 22 at their outer end portions as indicated are provided with the annular extension 23 dimensioned with their outer turned portions thereof at 33 and 34 to fit snugly within the shouldered bore 35 of the body, and within the bore 36 of the retaining ring 37 for the seats and closure member mounted substantially at the body open end 38 of the cylindrical bore 18.

As indicated at the inner end of the body 1, the inner one of seat rings 22 bears against the body annular shoulder 39, thereby gripping or clamping the split cage annular flange 19 firmly in place as shown. At the opposite end portion 38 of the cylindrical bore 18, the other seat ring 22 is similarly held against axial movement at 41 by the annular shoulder 21 thus designated. In both instances, the seat rings 22 are preferably provided with the O-rings 42 and 43 for sealing against line fluid. The end abutting retaining ring member 37 is similarly sealed at 44 by means of the O-ring for the same purpose. In order to hold the respective halves of split cage member 16 in suitable assembled position, split or snap rings 45 and 46 are employed for such purpose.

Figure 2:
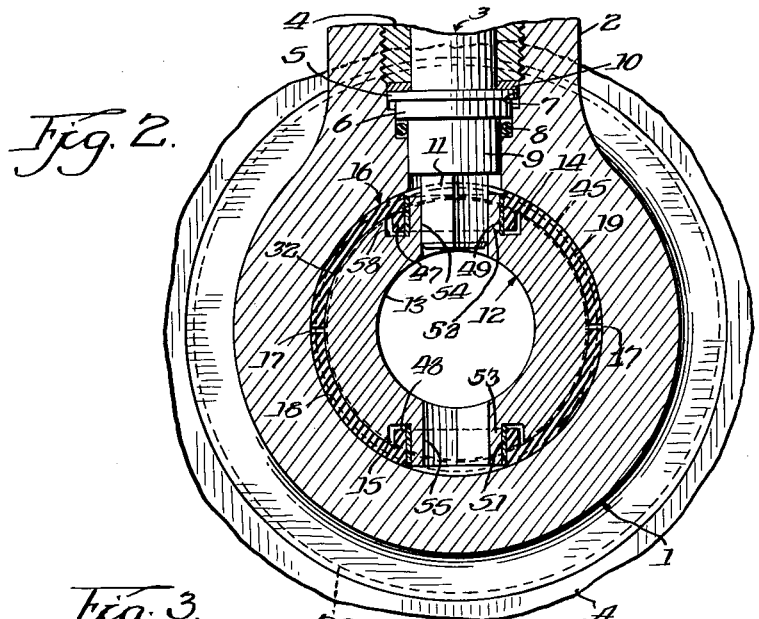
FIG. 2 is a fragmentary transverse sectional view taken on the line 2—2 of FIG. 1.

As shown more clearly in FIG. 2, the split cage 16 at upper and lower portions thereof is provided respectively with the downwardly extending annular hub 47 and similarly with an upwardly extending hub portion at 48 also of hollow cylindrical configuration, each of the said cylindrical portions being formed at 49 and 51 respectively to receive the similarly formed hollow trunnions 52 and 53 on the closure member 12. The inner portions of the said trunnions 52 and 53 are formed on their interior with the polygonally arranged surfaces 54 and 55. At the upper portion of the closure member, the polygonal portion engages in non-rotatable relation the similarly formed polygonal extension 11 on the lower portion of the stem. As to the lower polygonal recess, it is preferably of the same form and dimensions as the upper hollow portion 54. It is interchangeably arranged, so that when it is desired, the ball closure member may be reversed from the position shown and in such case the relieved portion 55 will engage the rotatable stem 3 at its polygonal portion 11. This reversability obviously allows for the valve seats to make new contacts with the closure member and thereby extends the life of the valve.

It will, of course, be understood that under certain severe service conditions in the field, relatively high frictional loads because of excessive transverse thrust may be encountered upon rotating the stem 3 engaging the recess portion 52 of the closure member in relation to the divided cage 16. Under such circumstances, it may be desirable to provide that upper and lower interposed wear-resisting hardened bushings, such as at 56 and 57, respectively, be used. Whether or not such provision is necessary or desirable of course depends upon the pressure conditions and the kinds of fluid encountered.

The upper and lower portions of the closure member 12 being annularly recessed at 58 and 59 respectively receive the respective upper and lower annular portions oppositely disposed at 47 and 48 accordingly to extend the length of the guide provided by the trunnion bearings 52 and 53 for said closure member. Upon completing the sub-assembly in which the ball closure member 12 is received between the oppositely disposed seats 22 and is enclosed by the respective halves of split cage 16, the said assembly is now ready for insertion within the valve body 1. With such insertion completed and with either the aperture 54 or 55 in the top side position for later engagement by the stem square 11, the retaining member 37 is now ready to be placed in the valve body bore 18 in position illustrated, followed by the positioning of a locking means such as the split retaining ring 61. The latter member is received within the body annular groove 62 and thus it engages the body to hold the retainer ring 37 against outward axial movement. The outer retaining ring as indicated at 63 suitably covers the snap ring 61 against direct contact with the line fluid and it may be suitably formed frusto-conically with a port to merge inward with a similarly tapered annular surface 65 of the ring member 37. It will now be apparent that the valve is easily assembled by the usual connections as indicated at A and B to the respective conduits C and D with gaskets E and F retained therebetween as shown. The outer end cover-ring 64 is retained within the body by abutting engagement with an inner end portion of the conduit D as illustrated.

By any suitable means (not shown), the rotation of the ball closure member 12 through the stem 3 may in the usual manner applicable to rotary valves be limited to ninety degrees of rotation by any suitable stops (not shown) cooperating between the rotating stem and the retaining bushing 4 or with the upper annular body portion 2.

It will also be apparent that by the manner of retention of the upper and lower halves of the split cage 16 within the body 1 and encompassing the seats 22 the latter members are retained in their desired axial position within the valve body. It will be noted further that the respective integral trunnion bearings 47 and 48 of each of the halves of the divided cage 16 will assume the transverse load imposed by line fluid pressure against the ball closure member 12. Thus it supplements the support provided by the stem 3 in its engagement of the ball closure member 12.

The completion of the assembly is then easily effected between the said stem and closure member upon proper rotation and positioning of the closure member as above stated so that the vertical axis of the closure member together with its apertures 54 and 55 will coincide with the similar axis of the valve stem 3. Because of the manner in which the seat rings are retained and supported within the divided cage 16, it will be apparent that extremely high fluid pressures can be handled with a minimum amount of distortion in the assembly and use of these elements being experienced.

It will be appreciated that only when the unit consisting of the divided cage, closure member and seats is firmly shouldered against the end surface 39 that the retaining snap ring 61 is then applied to the casing.

Figure 3:
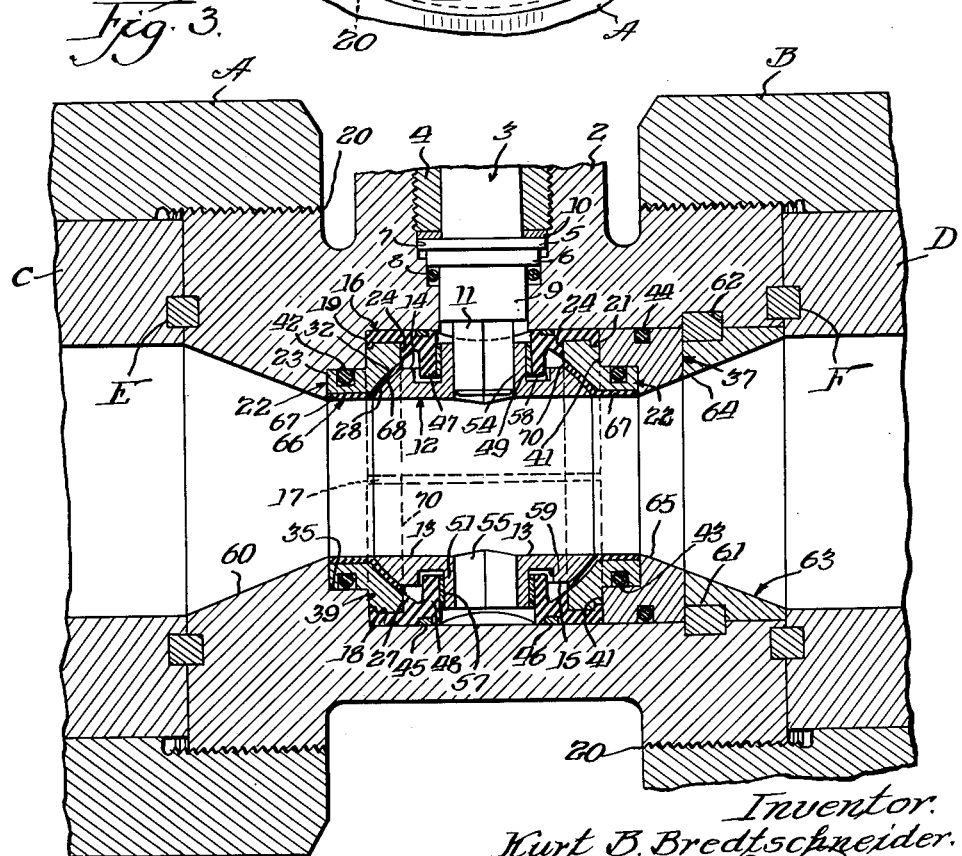

Referring now to the modification shown in FIG. 3, the valve construction shown is substantially the same as that described in connection with FIGS. 1 and 2. However, it will be noted that in the instant form the use of interposed flared seat liner members 66 of hollow cylindrical configuration in relation to valve horizontal axis fit the bore 67 of the seat rings 22 snugly and are also provided with an inner flared extension 68 suitably formed to fit the contour of the surfaces 31 and 32 of the closure member 12 closely and terminating inwardly annularly as at 70. Each of the interposed members 66 is preferably arranged in such manner as to fit snugly and serve as a shield against the entry of foreign matter and the like between the closure member 12 and the respective seat members 22 as shown, in addition to imparting improved seating facilities for the closure member. It will also be clear that since the annular flared portion 68 is firmly positioned between the respective body seats 22, there is positive assurance of protection against any substantial displacement of the interposed seat liners 66 under high pressure flow conditions, while at the same time, protecting the valve against corrosion, erosion and other forms of line fluid attack. The said seat liner members 66 may be cemented to the seats or weld attached annularly where they join the ports 60 and 65.

In FIG. 4, a further modification of the invention is shown. In this construction, each of the body seat rings generally designated 69 are provided with a hollow cylindrical portion or shank 71 which is received closely within the body annular groove 72 of the body at one end thereof and within the similarly functioning annular groove 73 of the retaining member 37 at the opposite end of the body 1. It will be noted in this construction that the flange portions 19 and 21 engage annular groves in the outer periphery of each of the seat rings as indicated, while at the interior peripheral portion of each of the seat rings within the grooves are preferably sealed as at 74 and 75.

In order to impart a higher degree of flexibility between the seat ring and the closure member, each of the seat rings 69 and 71 as at 76 and 77 are formed with the interiorly extending annular relatively resilient portions to engage the spheroidal surfaces 32 of the ball closure member. Preferably, the annular portions 76 allow for their inward extension at 78 and 79 to fill in the annular void or space between the closure member and seat rings and thereby prevent the accumulation of undesirable foreign matter with its obviously objectionable scoring, or otherwise affecting the critical seating surfaces between the ring lip portions 76 and the respective surfaces 32 of the closure member 12. This construction possesses the advantages of improved flexibility in the seat ring structure while at the same time allowing for firm guiding and positioning of the said seat rings in both body and retaining ring. In other respects, the modified construction is similar to that described in connection with FIGS. 1 and 2 and it is therefore deemed unnecessary to repeat the description here.

Referring now to a further modified form of the invention shown in FIG. 5, this construction also is quite similar to that described in connection with the previous figures. In the instant modification, the split cage member generally designated 81 is suitably recessed annularly as at 82 and 83 to receive snugly the relatively thinner seat rings generally designated 84 having annular base surfaces 85. Here they are provided with the fluid sealing O-rings 86 and 87 for bearing against the transverse shoulder or annular surface 88 of the body 1 and the annular surface 89 of the retaining ring 37. As in the previously described figures, the spheroidal contact surfaces 32 of the closure member make fluid sealing contact at 28 and 29 on the seat rings 84 as indicated. In this construction with the closure member 12 in the position shown, the seat rings are mounted within the respective bored portions 82 and 83 of the seats 84. The latter have a degree of axial movement and a certain unique cooperation with the closure member in the firmness of mounting that differs from the constructions previously described. It will be noted in the latter connection that in this modification the seat rings 84 do not employ the integral shank or cylindrical portions 23 of the previously described structures of FIGS. 1 to 4 inclusive. Instead the annular surfaces 88 and 89 support the seats 84. Also the upper and lower halves comprising the divided cage 81 lack the flanges 19 and 21 of the other figures. However, in all other respects, the general manner in which the cage is mounted, its form and function in resisting end thrust for the ball closure member is similar to that previously described.

While several embodiments have been shown and described, it will be clear that these disclosures serve only the purpose of illustration and not of limitation and the scope of the invention should therefore be measured by the appended claims.

I claim:
1. A ball valve having a casing with port opening therethrough constituting an inlet and an outlet therefor, an annular bored recess located internally of the said casing and connecting said inlet and outlet, a ported substantially spheroidal type of closure member having trunnions for rotation within said casing in the said annular recess, actuating means for the closure member inserted through a top opening in the casing, seat rings adapted to fit within said annular bored recess, a substantially cylindrical split cage member insertable with said seat rings and closure member as a unit through one of the said port openings, each half of the said split cage member providing support for one of the trunnions and having axially aligned bearings for journaling the said closure member, each of the said split cage halves having an annular portion surrounding at least a peripheral portion of the length of said seat rings, means cooperating with the said casing recess for holding the said closure member, seat rings and cage halves against substantial longitudinal movement relative to the said casing.

2. A ball type of valve having a casing with port opening constituting an inlet and an outlet therefor, annular bored recesses located internally of the said casing communicating with said inlet and outlet, a ported spheroidal type of closure member having trunnions for rotation within said casing between the said annular recesses, actuating means for the closure member, seat rings adapted to fit within said bored annular recesses, a substantially cylindrical split cage removable as a unit through one of the said port openings, upper and lower half portions of the said cage providing bearing means with axially aligned means for journaling said trunnions of said closure member, each of the said cage halves having an annular portion engaging at least a peripheral portion of the said seat rings, engaging means cooperating with said casing including a retainer ring mounted in the casing port opening for holding the said cage half portions against substantial endwise movement within the recesses of the said casing whereby to maintain said closure member in axial alignment with the actuating means.

3. A ball type of valve having a casing with port opening constituting an inlet and an outlet therefor, a valve chamber comprising annular bored recesses with their axes horizontally disposed relative to the said casing and connecting said inlet and outlet, a ported spheroidal type of closure member having upper and lower trunnions for rotation within said casing between the said annular recesses, actuating means for said closure member, seat rings adapted to fit within said annular recesses, a substantially cylindrical split cage removable with said seat rings and closure member through one end of the said port opening, each half of the said cage having vertically aligned bearings on the valve central axis providing for journalling said trunnions of the closure member, each of the said cage halves having an inwardly extending portion encompassing a peripheral portion of the said seat rings, a split ring engaging said casing, and a retainer ring mounted in the said casing in abutting relation to one of said cage halves to hold the said cage halves against substantial endwise movement within the said casing.

4. A ball valve having a casing with port openings constituting an inlet and an outlet therefor, annular recess means within the said casing connecting said inlet and outlet, a ported spehroidal closure member journaled for rotation on a vertical axis within said casing within the said casing annular recess means, actuating means for the closure member mounted in a side opening of the casing, seat rings adapted to fit closely within said annular recess means, a substantially cylindrical divided cage removable with said seats and closure member as a unit through one end of the said annular recess means, each half of the said cage enclosing said closure member and having oppositely disposed projecting means providing axially aligned bearings for the journaling of said closure member, at least one of the said cage halves having an inturned portion enclosing a peripheral portion of the said seat rings, and retainer means engaging said casing and an end portion of the said cage halves to hold the latter members against a shouldered portion of said annular recess means to inhibit longitudinal movement of the divided cage within the said casing.

5. A ball valve having a casing with port opening therethrough constituting an inlet and an outlet for the valve, recess means in the said casing forming a portion of said port opening and connecting said inlet and outlet, a rotatable ported spheroidal plug closure member journaled within said casing between the said recess means, seat rings mounted within said annular recess, a split cylindrical cage enclosing at least a peripheral portion of the said seat rings removable as a unit through one of the said port openings, each half of the said cage having vertically aligned means for journaling of said closure member, each of the said cage halves being mounted in upper and lower planes in spaced apart shouldered relation within said casing and having an annular recessed portion receiving an outer annular portion of the said seat rings, means engaging said casing cooperating with said cage halves and said seat rings to prevent the substantial endwise movement of said cage halves within the said casing upon the application of line fluid pressure from within one of the casing port openings to effect transmission of the fluid pressure acting on the port opening area to the said vertically aligned means for journalling of the said closure member.

6. A ball valve having a casing with port opening comprising an inlet and an outlet therefor with a bored passage therebetween defined by a shouldered end portion inward of the end limits of the casing, a rotatable ported spheroidal type closure member journaled for rotation within said casing bored passage between the said inlet and outlet, aligned seat rings within the bored passage having concave surfaces for receiving said closure member, axially removable stem actuating means for said closure member, a substantially cylindrical divided cage enclosing said closure member and at least a portion of the said seat rings and being removable as a unit from an open end of the casing bored passage remote from said shouldered end portion, each half of the said cage having inwardly extending axially aligned portions providing bearing means for said rotatable closure member, the said divided cage being relatively closely received in said casing bored passage, means cooperating with said casing and with outer end portions of said cage halves to hold the said unit against substantial longitudinal movement relative to the shouldered end portion of said bored passage.

7. The subject matter of claim 4, the said closure member actuating means having a lower portion extending through one of the halves of the said cylindrical divided cage to engage said closure member in non-rotatable relation thereto.

8. The subject matter of claim 6, the cage half portions having peripheral portions thereof provided with means for engaging arcuately extending portions of the said seat rings.

9. The subject matter of claim 6, the combination including interposed seat means between said closure member and seat rings.

10. The subject matter of claim 6, the holding means for said unit being enclosed by a portion of said casing port opening.

11. The subject matter of claim 6, pressure responsive fluid sealing means cooperating with peripheral portions of the said seat rings and retainer means.

12. The subject matter of claim 6, means enclosing said holding means to shield the later against direct contact with line fluid in the valve.

13. The subject matter of claim 6, the said closure member having oppositely disposed apertured portions for selective engagement with said stem actuating means whereby to permit said closure member to be reversibly mounted within said casing.

14. The subject matter of claim 13, at least one of the halves of the said cage being transversely apertured to allow for projection of said stem actuating means to engage one of said closure member apertured portions.

References Cited in the file of this patent

UNITED STATES PATENTS

| | | |
|---|---|---|
| 1,616,386 | O'Stroske | Feb. 1, 1927 |
| 2,839,266 | Kaiser | June 17, 1958 |
| 2,885,179 | Hartmann | May 5, 1959 |
| 2,905,197 | Janes | Sept. 22, 1959 |